(12) United States Patent
Mese et al.

(10) Patent No.: US 10,748,535 B2
(45) Date of Patent: Aug. 18, 2020

(54) TRANSCRIPTION RECORD COMPARISON

(71) Applicant: Lenovo (Singapore) Pte. Ltd., Singapore (SG)

(72) Inventors: John Carl Mese, Cary, NC (US); Nathan J. Peterson, Oxford, NC (US); Russell Speight VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 183 days.

(21) Appl. No.: 15/928,819

(22) Filed: Mar. 22, 2018

(65) Prior Publication Data

US 2019/0295539 A1     Sep. 26, 2019

(51) Int. Cl.
| | | |
|---|---|---|
| *G10L 15/00* | (2013.01) | |
| *G10L 15/22* | (2006.01) | |
| *G10L 15/26* | (2006.01) | |
| *G10L 25/51* | (2013.01) | |

(52) U.S. Cl.
CPC ............ *G10L 15/22* (2013.01); *G10L 15/26* (2013.01); *G10L 25/51* (2013.01); *G10L 2015/223* (2013.01)

(58) Field of Classification Search
CPC ................................ G10L 15/22; G10L 15/00
USPC ........ 704/235, 275, 270, 252, 243, 278, 201
See application file for complete search history.

(56) References Cited

U.S. PATENT DOCUMENTS

| | | | | |
|---|---|---|---|---|
| 6,140,568 A | * | 10/2000 | Kohler | G10H 1/0066 |
| | | | | 84/616 |
| 6,421,643 B1 | * | 7/2002 | Kahn | G10L 15/26 |
| | | | | 704/270 |
| 2003/0225578 A1 | * | 12/2003 | Kahn | G10L 15/26 |
| | | | | 704/243 |
| 2006/0212295 A1 | * | 9/2006 | Wasserblat | G10L 25/48 |
| | | | | 704/252 |
| 2008/0052082 A1 | * | 2/2008 | Tsai | G10L 15/26 |
| | | | | 704/275 |
| 2010/0268536 A1 | * | 10/2010 | Suendermann | G10L 15/1815 |
| | | | | 704/243 |
| 2011/0087491 A1 | * | 4/2011 | Wittenstein | G10L 15/26 |
| | | | | 704/235 |
| 2013/0211826 A1 | * | 8/2013 | Mannby | H04M 3/42221 |
| | | | | 704/201 |
| 2015/0161985 A1 | * | 6/2015 | Peng | G10L 15/063 |
| | | | | 704/235 |
| 2015/0279355 A1 | * | 10/2015 | Veksler | G10L 15/063 |
| | | | | 704/235 |

(Continued)

*Primary Examiner* — Michael Colucci
(74) *Attorney, Agent, or Firm* — Ference & Associates LLC

(57) ABSTRACT

One embodiment provides a method, including: receiving, at an information handling device, voice data from a user; generating a transcription record comprising the voice data; transmitting the voice data to at least one other device; receiving, from the at least one other device, another transcription record, generated by the at least one other device, associated with the transmitted voice data; identifying, by comparing the transcription record and the another transcription record, at least one difference between the transcription record and the another transcription record; and providing, responsive to identifying a difference, a notification. Other aspects are described and claimed.

18 Claims, 3 Drawing Sheets

(56) References Cited

U.S. PATENT DOCUMENTS

2016/0042738 A1\* 2/2016 Belkin .................... H04M 3/22
                                                    704/235
2018/0082680 A1\* 3/2018 Pereg .................... G10L 15/197

\* cited by examiner

US 10,748,535 B2

TRANSCRIPTION RECORD COMPARISON

BACKGROUND

Information handling devices ("devices"), for example smart phones, tablet devices, laptop and personal computers, and the like, may be capable of performing communication functions (e.g., phone calls, audio chat, video calls, etc.) with other devices. A user may, for example, provide voice input to an input device (e.g., microphone, etc.) operatively coupled to their device. The voice input may then be transmitted to one or more other devices that are associated with one or more other users.

BRIEF SUMMARY

In summary, one aspect provides a method, comprising: receiving, at an information handling device, voice data from a user; generating a transcription record comprising the voice data; transmitting the voice data to at least one other device; receiving, from the at least one other device, another transcription record, generated by the at least one other device, associated with the transmitted voice data; identifying, by comparing the transcription record and the another transcription record, at least one difference between the transcription record and the another transcription record; and providing, responsive to identifying a difference, a notification.

Another aspect provides an information handling device, comprising: a processor; a memory device that stores instructions executable by the processor to: receive voice data from a user; generate a transcription record comprising the voice data; transmit the voice data to at least one other device; receive, from the at least one other device, another transcription record, generated by the at least one other device, associated with the transmitted voice data; identify, by comparing the transcription record and the another transcription record, at least one difference between the transcription record and the second transcription record; and provide, responsive to identifying a difference, a notification.

A further aspect provides a product, comprising: a storage device that stores code, the code being executable by a processor and comprising: code that receives voice data from a user; code that generates a transcription record comprising the voice data; code that transmits the voice data to at least one other device; code that receives, from the at least one other device, another transcription record, generated by the at least one other device, associated with the transmitted voice data; code that identifies, by comparing the transcription record and the second transcription record, at least one difference between the transcription record and the another transcription record; and code that provides, responsive to identifying a difference, a notification.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
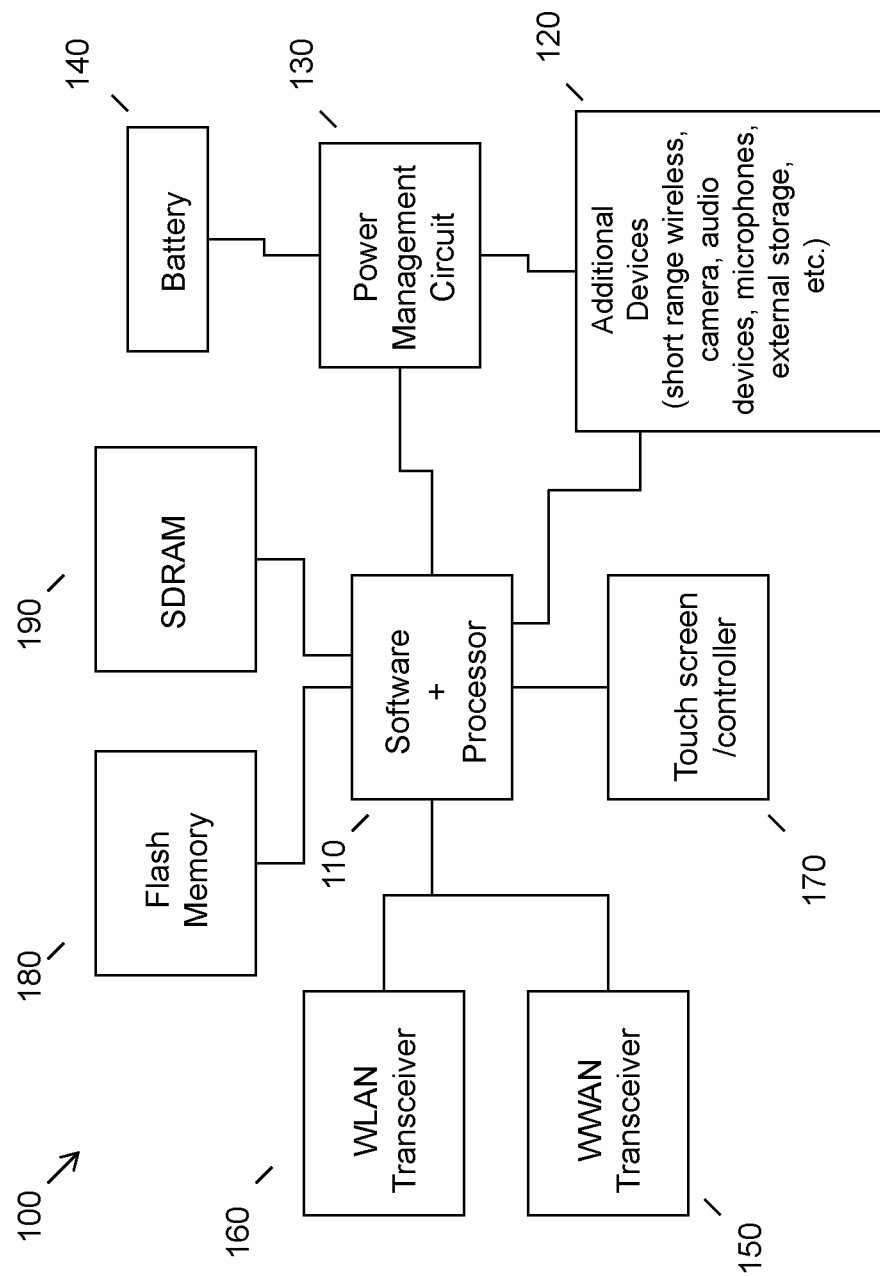
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

When using devices to audibly communicate (e.g., via phone calls, audio chat, video chat, etc.) users may often find that portions of their provided voice input were not received, or were not adequately received, by one or more intended recipients. Bad network connections, poor software, malfunctioning hardware, and the like may all contribute to a substandard voice conversation between users. In these situations, if voice data is lost or dropped, the conversation may be interrupted. For example, a user that enters a dead zone (e.g., a tunnel, an area with limited cellular coverage, etc.) while talking on the phone with another user may find that at least a portion of their provided input was not received by the other user while in the dead zone. In another example, a lecturing professor teaching an online course may find that one or more students may miss one or more portions of the lecture (e.g., due to a bad network connection, etc.).

An existing solution may generate a voice-to-text transcription record of the input provider's voice input. A recipient user may be provided with or may access that transcription record (e.g., during the call, after the call is complete, etc.) to view one or more portions of the voice conversation they may have missed. However, this conventional solution does not inform the input-provider that a recipient user is missing portions of the conversation. Therefore, the input-provider may continue speaking while being oblivious to the fact that a recipient may have missed one or more important parts of the conversation. Additionally, recipients who are unable to constantly monitor the transcription record (e.g., recipients who are driving, recipients who are engaged in other tasks, recipients who only receive the transcription record after the call is complete, etc.) may still miss parts of the conversation while the conversation is occurring. In these situations, the recipients may be required to interrupt the input provider to notify them that a portion of their input was not received or understood. These interruptions may disrupt the flow of the conversation, especially if frequent instances of voice input loss occur during a single conversation.

Accordingly, an embodiment provides a method for notifying a voice input provider ("speaker") that at least one recipient may not have adequately received the voice input. In an embodiment, voice data from a speaker may be received (e.g., by the speaker's device, etc.) and a transcription record of that voice data may be generated. The voice data may then be sent to one or more other devices on which another transcription record is generated. For example, voice data may be sent to a recipient's smart phone and output to the recipient via an output device (e.g., a speaker, etc.) of the recipient's smart phone. An embodiment may, as the voice data is being output by the output device, capture the output voice data using an input device (e.g., a microphone, etc.) of the recipient's device. The captured voice data may then be transcribed into another transcription record by the recipient's device. The second transcription record may provide an indication as to what the recipient is actually hearing. An embodiment may compare the two transcription records to determine if there are any differences between them and thereafter provide a notification to the speaker and/or the recipient of the differences. Additionally, an embodiment may update or replace a recipient's transcription record with the speaker's transcription record so the recipient has an accurate accounting of the voice data the speaker provided. Such a method may enable a speaker to be apprised of any issues in communicating with one or more recipients and may also allow recipients to receive a more accurate accounting of what a speaker actually said.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, a thermal sensor, etc. System 100 often includes a touch screen 170 for data input and display/rendering. System 100 also typically includes various memory devices, for example flash memory 180 and SDRAM 190.

Figure 2:
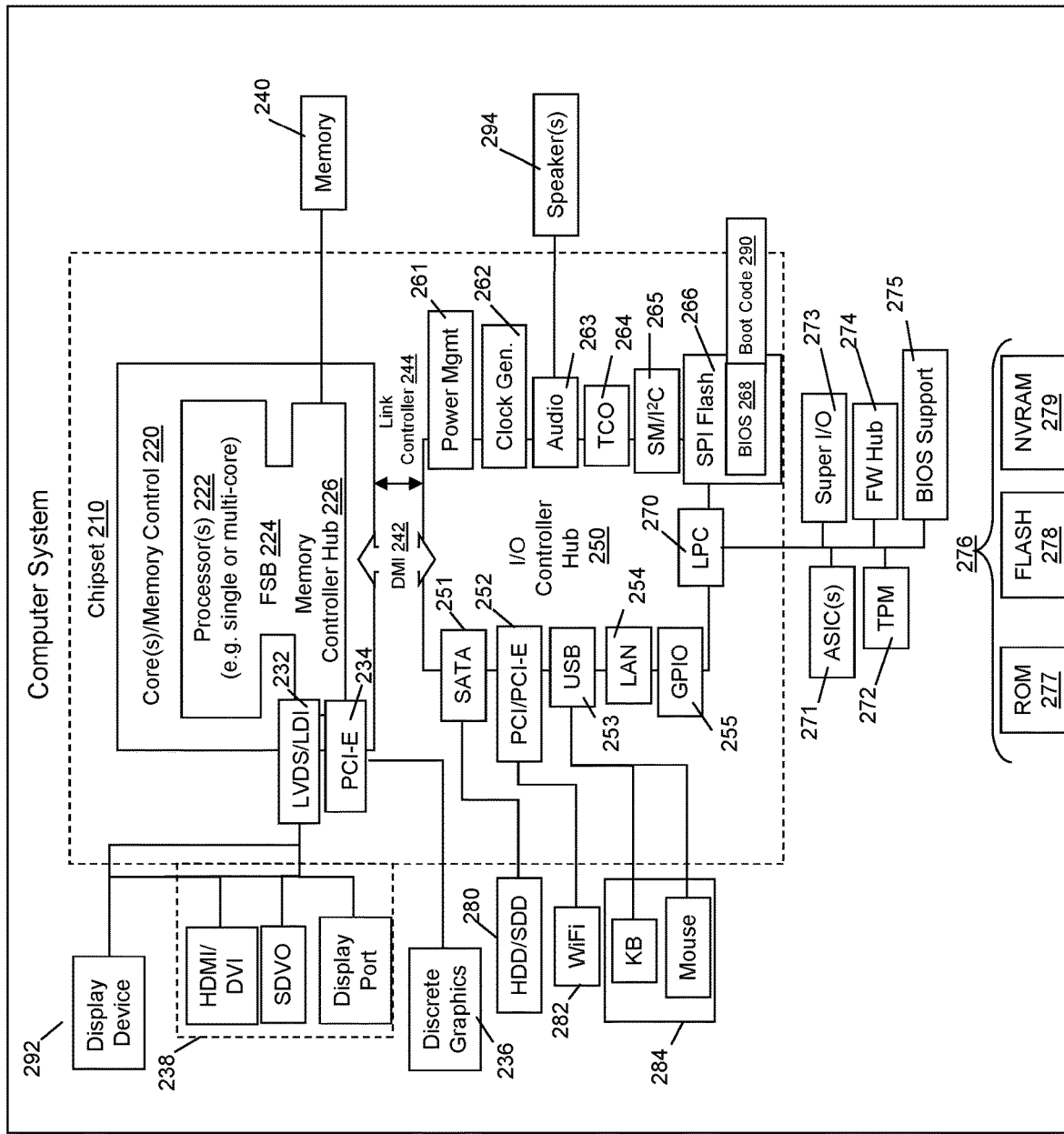
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as smart phones, tablets, smart speakers, smart appliances, personal computer devices generally, and/or electronic devices that a user may interact with to provide voice input to and that may transmit that voice input to another device. For example, the circuitry outlined in FIG. 1 may be implemented in a tablet or smart phone embodiment, whereas the circuitry outlined in FIG. 2 may be implemented in a personal computer embodiment.

Figure 3:
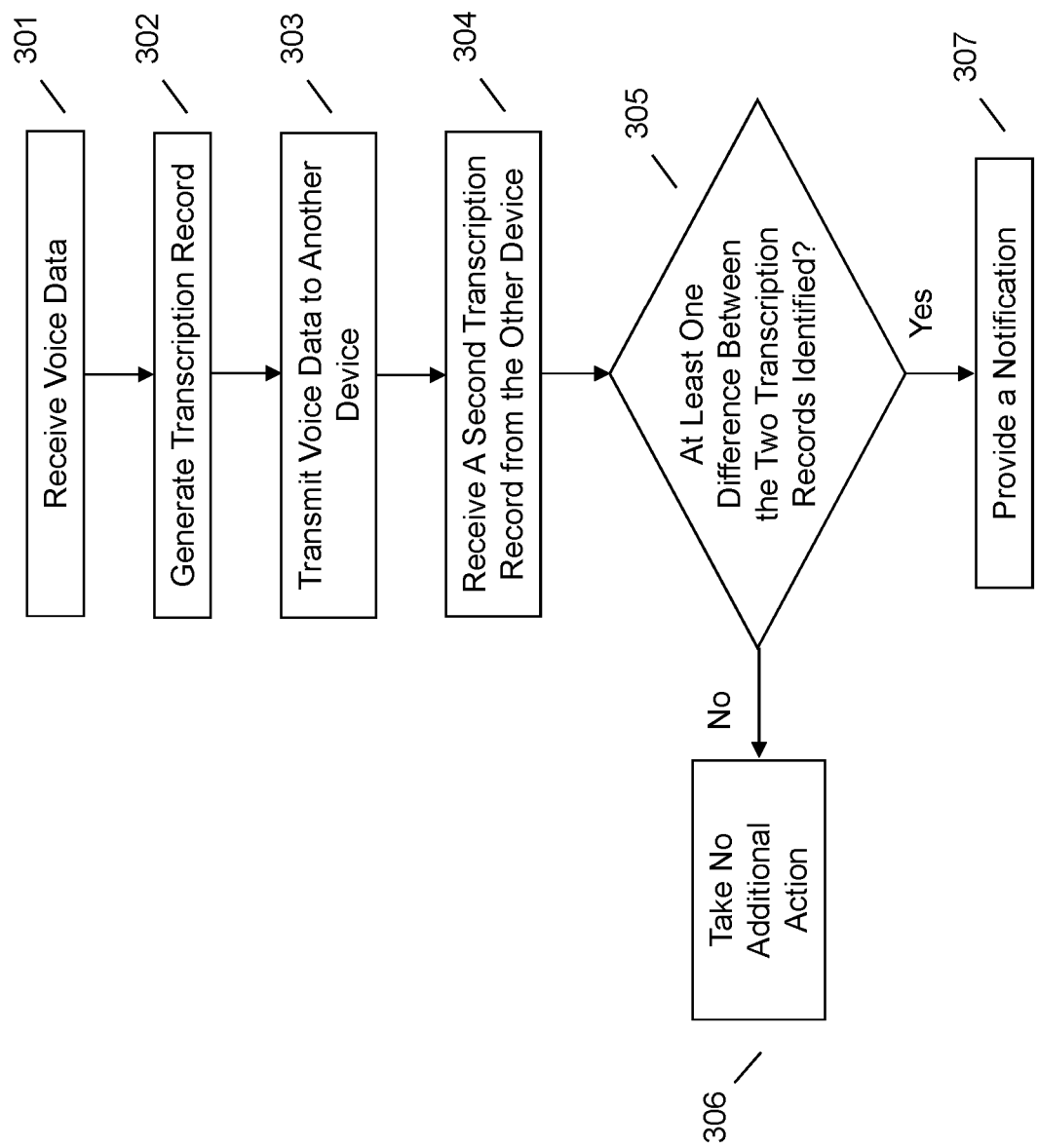
FIG. 3 illustrates an example method of providing a notification responsive to identifying a difference between two or more transcription records.

Referring now to FIG. 3, an embodiment may provide a notification informing one or more users that a difference in transcription records associated with a conversation has been identified. At 301, an embodiment may receive voice input data from a user ("speaker") at a speaker's device (e.g., smart phone, tablet, laptop and/or personal computer, etc.). The voice input may be associated with and/or provided during a phone call, a wireless call, video or audio chat, and the like.

In an embodiment, the voice input may be received by an input device (e.g., a microphone, an audio capture device, etc.) operatively coupled to or in communication with the speaker's device. In an embodiment, the input device may be an input device integral to the speaker's device. For example, a smart phone may be disposed with a microphone capable of receiving voice input data. Alternatively, the input device may be disposed on another device and may transmit received voice input data to the speaker's device. For example, voice input may be received at a smart speaker that may subsequently transmit the voice data to another device (e.g., to a speaker's smartphone for processing, etc.). Voice input data may be communicated from other sources to the speaker's device via a wireless connection (e.g., using a BLUETOOTH connection, near field communication (NFC), wireless connection techniques, etc.), a wired connection (e.g., the device is coupled to another device or source, etc.), through a connected data storage system (e.g., via cloud storage, remote storage, local storage, network storage, etc.), and the like.

In an embodiment, the input device may be configured to activate responsive to receiving an indication that a speaker has initiated a communication function or voice input application. For example, a microphone on a speaker's smartphone may automatically activate responsive to identifying that the speaker has engaged in a call with another individual. In an embodiment, the input device may be configured to continuously receive voice input data by maintaining the input device in an active state. The input device may, for example, continuously detect voice input data even when other sensors (e.g., cameras, light sensors, speakers, other microphones, etc.) associated with the speaker's device are inactive. Alternatively, the input device may remain in an active state for a predetermined amount of time (e.g., 30 minutes, 1 hour, 2 hours, etc.). Subsequent to not receiving any voice input data during this predetermined time window, an embodiment may switch the input device to a power off state. The predetermined time window may be preconfigured by a manufacturer or, alternatively, may be configured and set by one or more users.

At 302, an embodiment may generate a transcription record of the voice data (e.g., on and/or by the speaker's device, etc.). In an embodiment, the transcription record may comprise a text-based transcription of a conversation between a speaker and one or more other recipient users. The transcription record may comprise a transcription of voice data provided by the speaker and/or may comprise a transcription of voice data received from the one or more recipients (e.g., voice data provided by a recipient to another device that is transcribed and thereafter transmitted to the user's device for incorporation into the transcription record, etc.). Additionally, time stamps and/or user identification labels may also be present in the transcription record that may provide an indication as to who provided a particular line of voice data and at what time. In an embodiment, the voice data may be transcribed continuously in substantially real-time dependent on processing capabilities of the speaker's device. In an embodiment, the transcription record may be stored locally (e.g., on the speaker's device, etc.), remotely (e.g., via cloud storage, remote storage, network storage, etc.), a combination thereof, and the like.

At 303, an embodiment may transmit, or send, the voice data to another device (e.g., a recipient's device, etc.). In an embodiment, the other device may be virtually any other device capable of receiving voice input transmissions from the speaker's device. For example, the other device may be a smart phone, tablet, smart speaker, laptop and/or personal computer, and the like associated with a recipient of the speaker's audible communication. In an embodiment, the voice data may be transmitted using a mobile network, a wireless network, another transmission technique, and the like. The voice data may be transmitted in substantially real-time (e.g., as a speaker provides the voice data to the device, etc.) or, alternatively, the voice data may be transmitted to a recipient device based upon a predetermined time delay and/or based upon a request to receive the voice data (e.g., the voice data may be transmitted responsive to a request to download an audio file from the speaker's device that comprises the speaker's voice data, etc.). In an embodiment, the voice data may be transmitted to a single device or may be transmitted to a plurality of other devices. For example, a professor may be live-streaming the audio of a lecture to a multitude of online students.

At 304, an embodiment may receive, from a recipient's device, a transcription record generated on and/or by the recipient device. This other transcription record may be a transcription of the transmitted voice data. For example, subsequent to receiving the voice data transmitted by the speaker's device, a recipient's device may output that voice data using one or more output devices (e.g., a speaker integral to the recipient's device, a speaker operatively coupled to the recipient's device, etc.) and substantially simultaneously capture the output voice data using one or more input devices (e.g., a microphone integral to the recipient's device, a microphone operatively coupled to the recipient's device, etc.). The recipient's device may thereafter transcribe the captured output voice data in a transcription record particular to the recipient's device. The recipient's transcription record may then be sent to the speaker's device and vice versa. Additionally and/or alternatively, an embodiment may comprise a third device (e.g., a cloud device, a server device, etc.) that receives and/or stores the transcription records provided by the speaker and recipient devices.

At 305, an embodiment may identify at least one difference between the transcription records. In the context of this application, a difference in the transcription records may refer to a difference in one or more words in a line of dialog between the two records, a difference in the presence of a line of dialogue (e.g., where one transcription record may miss an entire line of dialogue that is contained in another transcription record, etc.), a difference between the percentage of similarity between the two transcription records, and the like. In an embodiment, the difference may be identified by comparing (e.g., using one or more conventional text and/or document comparison techniques, etc.) the speaker's transcription record with one or more recipient transcription records. The comparison may be conducted on the speaker's device, the recipient's device, a third device, a combination thereof, and the like.

Responsive to identifying, at 305, that there are no differences between the two or more transcription records, an embodiment may, at 306, take no additional action. Conversely, responsive to identifying, at 305, that there is at least one difference, an embodiment may provide, at 307, a notification. The notification may serve to alert the speaker or one or more recipients that there may be a difference between what is spoken by the speaker and what is heard by the one or more recipients.

In an embodiment, the notification may be virtually any type of notification such as an audible notification (e.g., an audible message, a predetermined sound, etc.), a visual notification (e.g., a message displayed on a display screen, visually distinguishing the difference, etc.), a haptic notification (e.g., a vibration of a user's device, etc.), and the like. In an embodiment, the notification may be provided on the speaker's device, another device (e.g., the recipient's device, another device operatively coupled to the user's device and/or recipient's device, etc.), a combination thereof, etc. using one or more output devices such as speakers, display screens, haptic actuators, other output devices, and the like.

With respect to visual notifications, an embodiment may visually distinguish an identified difference in one or more of the transcription records by highlighting the difference (e.g., highlighting the words in the line of dialogue that are different, highlighting the entire line of dialogue comprising the different words, etc.), providing a visual indicator in proximity to the difference (e.g., a small symbol on the side of the transcription record close to the transcribed line of dialogue comprising the difference, etc.), and the like. For example, responsive to identifying that a transcription record generated by the speaker's device comprises a line of dialogue that has one or more words that are different from a corresponding line of dialogue in another transcription record generated by the recipient's device, an embodiment may highlight the line of dialogue on the speaker's transcription record, the recipient's transcription record, a combination thereof, and the like.

In an embodiment, the notification may be provided responsive to identifying a single difference between transcription records. For example, responsive to identifying that a transcription record generated by the speaker's device comprises a line of dialogue that is missing, or is different from, a corresponding line of dialogue in another transcription record generated by the recipient's device, an embodiment may provide a notification. In an embodiment, the notification may be provided only after a predetermined number of differences have been identified. For example, an embodiment may not provide a notification until 5 or more differences have been identified. In another embodiment, the notification may be provided only after a predetermined number of differences have been identified in a predetermined time frame (e.g., 10 seconds, 30 seconds, 1 minute, etc.). For example, an embodiment may not provide a notification until 3 or more differences have been identified within 10 seconds. In another embodiment, the difference between transcription records may refer to a percentage of similarity between the transcription records and a notification may not be provided until the percentage of similarity between the transcription records falls below a predetermined threshold. For example, an embodiment may not provide a notification until the percentage of similarity between transcription records falls below 85%. In an embodiment, the notification may be provided in substantially real-time. For example, an embodiment may provide the notification substantially immediately responsive to identifying that there are one or more differences between transcription records.

In an embodiment, a transcription record generated by a recipient's device may be updated with the contents of the transcription record generated by the speaker's device. In an embodiment, the update may comprise the replacement of one or more portions of the recipient's transcription record associated with the identified difference with one or more corresponding portions of the speaker's transcription. In another embodiment, the update may comprise the replacement of the entirety of the recipient's transcription record with the speaker's transcription record. For example, an embodiment may transmit the entirety of the speaker's transcription record to the recipient's device after a communication session is complete. The recipient's transcription record may thereafter be replaced with the speaker's transcription record. The aforementioned updates may result in the recipient's transcription record matching, or substantially matching, the speaker's transcription record.

The various embodiments described herein thus represent a technical improvement to conventional speaker notification techniques. Using the techniques described herein, an embodiment may generate a voice-to-text transcription record of voice input provided by a speaker. An embodiment may also generate a voice-to-text transcription record of received voice input from a recipient's perspective. An embodiment may thereafter compare the two or more transcription records to identify whether there is a difference. Responsive to identifying a difference, an embodiment may provide a notification to the speaker, recipient, or both that the speaker's voice input may not be adequately received and/or comprehend by the recipient. An embodiment may also update and/or replace a recipient's transcription log with the contents in the speaker's transcription log. Such techniques may enable a speaker to be informed of any issues in communication. Additionally, such techniques may enable one or more recipients to receive a more accurate accounting of what a speaker said.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, at an information handling device, voice data from a user;
   generating a transcription record comprising the voice data;
   transmitting the voice data to at least one other device;
   receiving, from the at least one other device, another transcription record generated by the at least one other device from the transmitted voice data, wherein the generation of the another transcription record comprises:
      outputting, using an output device operatively coupled to the at least one other device, the transmitted voice data; and
      receiving, at an input device of the at least one other device, the output transmitted voice data;
   identifying, by comparing the transcription record and the another transcription record, at least one difference between the transcription record and the another transcription record; and
   providing, responsive to identifying a difference, a notification.

2. The method of claim 1, wherein the providing comprises providing the notification after a predetermined number of differences have been identified.

3. The method of claim 1, wherein the providing comprises providing the notification in substantially real-time.

4. The method of claim 1, wherein the providing comprises providing the notification using at least one of the information handling device and the at least one other device.

5. The method of claim 1, wherein the notification comprises at least one of an audible notification and a visual notification.

6. The method of claim 5, wherein the notification is associated with the visual notification and wherein the providing the visual notification comprises visually distinguishing the at least one difference.

7. The method of claim 1, wherein the generating comprises continuously generating the transcription record.

8. The method of claim 1, wherein the at least one other device comprises a plurality of other devices.

9. The method of claim 1, further comprising updating the another transcription record to match the transcription record.

10. An information handling device, comprising:
    a processor;
    a memory device that stores instructions executable by the processor to:
    receive voice data from a user;
    generate a transcription record comprising the voice data;
    transmit the voice data to at least one other device;
    receive, from the at least one other device, another transcription record generated by the at least one other device from the transmitted voice data, wherein the generation of the another transcription record comprises:
       outputting, using an output device operatively coupled to the at least one other device, the transmitted voice data; and
       receiving, at an input device of the at least one other device, the output transmitted voice data;
    identify, by comparing the transcription record and the another transcription record, at least one difference between the transcription record and the second transcription record; and
    provide, responsive to identifying a difference, a notification.

11. The information handling device of claim 10, wherein the instructions executable by the processor to provide comprise instructions executable by the processor to provide the notification after a predetermined number of differences have been identified.

12. The information handling device of claim 10, wherein the instructions executable by the processor to provide comprise instructions executable by the processor to provide the notification in substantially real-time.

13. The information handling device of claim 10, wherein the instructions executable by the processor to provide comprise instructions executable by the processor to provide the notification using at least one of the information handling device and the at least one other device.

14. The information handling device of claim 10, wherein the notification comprises at least one of an audible notification and a visual notification.

15. The information handling device of claim 14, wherein the notification is associated with the visual notification and wherein the instructions executable by the processor to provide the visual notification comprise instructions executable by the processor to visually distinguish the at least one difference.

16. The information handling device of claim 10, wherein the instructions executable by the processor to generate comprise instructions executable by the processor to continuously generate the transcription record.

17. The information handling device of claim 10, wherein the instructions are further executable by the processor to update the second transcription record to match the transcription record.

18. A product, comprising:

a storage device that stores code, the code being executable by a processor and comprising:

code that receives voice data from a user;

code that generates a transcription record comprising the voice data;

code that transmits the voice data to at least one other device;

code that receives, from the at least one other device, another transcription record generated by the at least one other device from the transmitted voice data, wherein the generation of the another transcription record comprises:

outputting, using an output device operatively coupled to the at least one other device, the transmitted voice data; and receiving, at an input device of the at least one other device, the output transmitted voice data;

code that identifies, by comparing the transcription record and the second transcription record, at least one difference between the transcription record and the another transcription record; and code that provides, responsive to identifying a difference, a notification.

* * * * *